United States Patent
Pittman et al.

(10) Patent No.: US 6,306,288 B1
(45) Date of Patent: Oct. 23, 2001

(54) PROCESS FOR REMOVING SULFUR COMPOUNDS FROM HYDROCARBON STREAMS

(75) Inventors: Rusty Pittman, Chicago; Blaise J. Arena, Des Plaines, both of IL (US); Albert J. Janssen, Sneek (NL)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/426,818

(22) Filed: Oct. 22, 1999

Related U.S. Application Data

(63) Continuation-in-part of application No. 09/061,661, filed on Apr. 17, 1998, now abandoned.

(51) Int. Cl.⁷ ........................ C10G 19/08; C10G 19/00; C10G 32/00
(52) U.S. Cl. ............... 208/235; 208/208 R; 208/226; 208/229; 208/230; 435/282; 210/601
(58) Field of Search ................ 208/208 R, 226, 208/229, 230, 235; 435/282; 210/601

(56) References Cited

U.S. PATENT DOCUMENTS

| | | | |
|---|---|---|---|
| 2,853,432 | 9/1958 | Gleim et al. | 196/32 |
| 2,921,020 | 1/1960 | Urban et al. | 208/205 |
| 2,988,500 | 6/1961 | Gleim et al. | 208/206 |
| 3,108,081 | 10/1963 | Gleim et al. | 252/428 |
| 3,408,287 | 10/1968 | Urban et al. | 208/207 |
| 4,156,641 | 5/1979 | Frame | 208/207 |
| 4,290,913 | 9/1981 | Frame | 252/428 |
| 4,562,300 | 12/1985 | LaFoy et al. | 208/230 |
| 4,666,689 | 5/1987 | Maple et al. | 208/206 |
| 4,913,802 | 4/1990 | Bricker et al. | 208/207 |
| 4,931,262 | 6/1990 | Sonta et al. | 435/282 |
| 5,354,545 | 10/1994 | Buisman | 423/242.1 |
| 5,480,550 | 1/1996 | Sublette | 435/282 |
| 5,496,729 | 3/1996 | Monticello | 435/282 |
| 5,510,265 | 4/1996 | Monticello | 435/282 |
| 5,686,293 | 11/1997 | Jenneman et al. | 435/282 |
| 5,789,236 | 8/1998 | Jenneman | 435/282 |
| 6,045,695 * | 4/2000 | Janssen et al. | 210/611 |

* cited by examiner

Primary Examiner—Walter D. Griffin
(74) Attorney, Agent, or Firm—John G. Tolomei; Frank S. Molinaro

(57) ABSTRACT

A process for removing $H_2S$ and mercaptans from a hydrocarbon stream is disclosed. A hydrocarbon stream such as a LPG stream is contacted with a weakly basic stream, e.g., a sodium bicarbonate stream in order to extract the $H_2S$ and mercaptans from the hydrocarbon stream into the basic stream. The basic stream is now treated in a reactor containing a sulfide oxidizing microorganism in order to convert the $H_2S$ to sulfur and the mercaptans to disulfides. Finally, the sulfur and disulfides are separated from the basic aqueous stream which can be recycled and used to treat a fresh hydrocarbon stream. The treated hydrocarbon stream is purified to the point that it passes the copper strip test, while the purified basic stream contains less than 0.08 g/l of elemental sulfur.

30 Claims, 1 Drawing Sheet

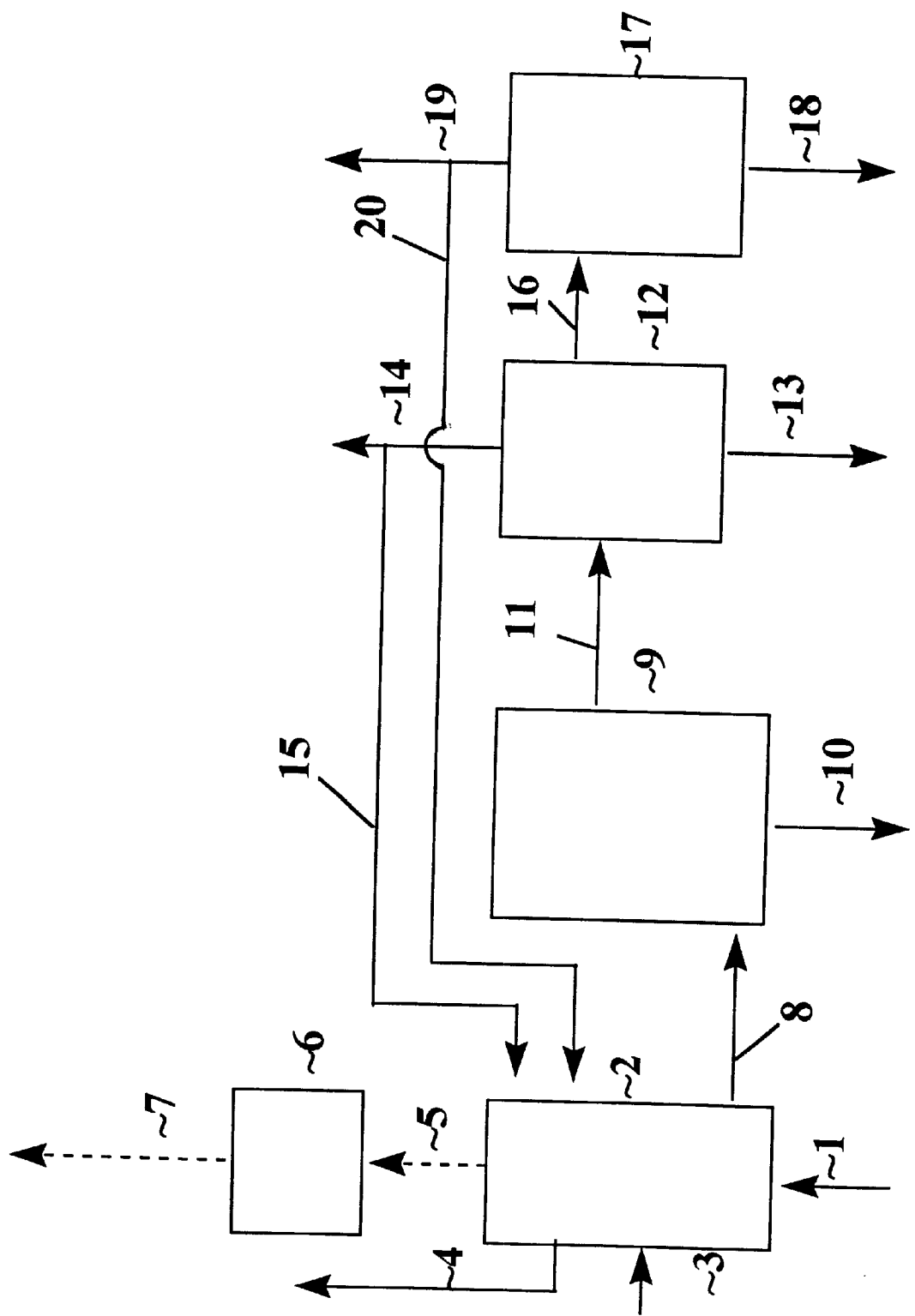

PROCESS FOR REMOVING SULFUR COMPOUNDS FROM HYDROCARBON STREAMS

CROSS REFERENCE TO RELATED APPLICATION

This application is a continuation-in-part of U.S. application Ser. No. 09/061,661 filed on Apr. 17, 1998, now abandoned, which is incorporated by reference.

FIELD OF THE INVENTION

This invention relates to a process for removing sulfur compounds such as $H_2S$ and mercaptans from a hydrocarbon stream. The process involves contacting the hydrocarbon stream with a weakly basic aqueous stream such as a sodium bicarbonate solution in order to extract the $H_2S$ and mercaptans from the hydrocarbon stream. The basic stream is now flowed to a reactor containing microorganisms and oxygen in order to convert the $H_2S$ to sulfur and the mercaptans to disulfides. The sulfur and disulfides are separated from the basic stream which can then be recycled and used to treat a fresh hydrocarbon stream.

BACKGROUND OF THE INVENTION

Hydrocarbon streams which contain sulfur compounds such as mercaptans are usually referred to as sour hydrocarbon streams. In order to render these hydrocarbon streams usable, it is common in the oil refining industry to treat these streams in one of two ways. One way is to contact the sour stream (usually a liquid stream) with an oxidation catalyst and an alkaline agent in the presence of an oxidizing agent such as air at reaction conditions in order to convert the mercaptans to disulfides, Another way to treat these sour hydrocarbon streams is to contact the hydrocarbon stream with a strongly basic solution in order to extract the mercaptans into the basic solution thereby forming mercaptides and then taking the basic solution and regenerating it by contacting it with an oxidizing catalyst, an alkaline agent, and an oxidizing agent such as air to convert the mercaptides to disulfides. The disulfides are separated from the basic solution which is recycled and used to extract more mercaptans from a fresh hydrocarbon stream. The first type of process is disclosed in a number of U.S. patents, including U.S. Pat. Nos. 3,108,081; 4,156,641; 4,913,802; 4,290,913 and 4,337,147. Processes in which the mercaptans are extracted with an alkaline solution are disclosed in U.S. Pat. Nos. 2,853,432; 2,921,020; 2,988,500 and 3,408,287.

It is also known that if the liquid hydrocarbon streams contain $H_2S$, that this must be removed separately before the mercaptans are either extracted and oxidized or oxidized to disulfides in one step. This separate process usually involves contacting the stream with either a basic solution or an adsorbent in order to remove the $H_2S$ present in the hydrocarbon stream. For example, U.S. Pat. No. 4,562,300 discloses a process for extracting mercaptans from hydrocarbon distillates with an alkaline solution having from about 5 to about 50 weight percent of an alkaline. Alkaline materials include sodium hydroxide, lithium hydroxide and potassium hydroxide. These alkaline materials are all very strong bases. U.S. Pat. No. 4,666,689 again discloses contacting hydrocarbon streams with alkaline solutions such as aqueous sodium hydroxide solutions. Finally, In U.S. Pat. No. 5,354,545 it is disclosed that sulfur compounds such as $H_2S$ are removed from a gaseous effluent. The gaseous waste stream is first contacted with a basic aqueous solution and then the aqueous solution is treated in a bioreactor thereby converting the $H_2S$ to elemental sulfur in order to regenerate the basic solution. It is disclosed in the '545 patent that an improvement in $H_2S$ removal is observed when the recirculating basic solution contains from 0.1 to 50 g/l of sulfur.

Applicants have developed a process whereby a liquid hydrocarbon stream containing both $H_2S$ and mercaptans is contacted with a weakly basic solution, e.g., bicarbonate solution, to simultaneously remove $H_2S$ and mercaptans. The basic solution which now contains $H_2S$ and mercaptans is treated in a bioreactor where the solution is contacted with a sulfide oxidizing bacteria in the presence of oxygen. The $H_2S$ is converted to elemental sulfur while the mercaptans are converted to disulfides. The oxygen level in the reactor is controlled in order to obtain these final products. Subsequently, the sulfur and disulfides are removed from the aqueous stream which is then recirculated and used to further extract hydrogen sulfide and mercaptans from a fresh liquid hydrocarbon stream. The treated liquid hydrocarbon stream now contains substantially less hydrogen sulfide and mercaptans, and can be used in various applications.

In comparison to U.S. Pat. No. 5,354,545 applicants have demonstrated that a weakly basic solution can be used to extract $H_2S$ and mercaptans from a liquid hydrocarbon stream. It is also surprising that the bacteria is able to function even when small amounts of hydrocarbons are present in the aqueous stream. Finally, applicants' treated aqueous stream will contain less than 0.08 g/l of elemental sulfur.

SUMMARY OF THE INVENTION

The present invention relates to a process for simultaneously removing $H_2S$ and mercaptans from a liquid hydrocarbon stream. Accordingly, one embodiment of the invention is a process comprising:

a) contacting the hydrocarbon stream with a weakly basic aqueous stream in an extraction column at extraction conditions, thereby extracting $H_2S$ and mercaptans into the basic stream;

b) separating the basic stream from the hydrocarbon stream and collecting a treated hydrocarbon stream, which passes the copper strip test;

c) flowing the basic stream to a reactor and contacting the stream for a sufficient time with a sulfide oxidizing microorganism, in the presence of sufficient oxygen, to oxidize the $H_2S$ to elemental sulfur and oxidize the mercaptans to disulfides;

d) separating the disulfides from the basic stream and flowing the basic stream to a first separation zone where the elemental sulfur is separated from the basic stream to give a purified basic stream, which contains less than 0.08 g/l of sulfur.

In an alternative embodiment, the sulfur is separated in a first separation zone and the disulfides are separated in a second separation zone. The basic stream which enters the reactor may also contain some hydrocarbons.

These and other objects and embodiments will become more apparent after a detailed description of the invention.

BRIEF DESCRIPTION OF THE DRAWING

The FIGURE is a simplified process flow diagram of one embodiment of the invention showing the extraction of $H_2S$ and mercaptans from a hydrocarbon stream with a weakly basic aqueous stream and the subsequent purification of the aqueous stream.

DETAILED DESCRIPTION OF THE INVENTION

The hydrocarbon streams which can be treated by the process of this invention can vary widely and usually contain from 2 to 30 carbon atoms and include both liquid and gaseous streams. Specific examples include what is commonly referred to as liquefied petroleum gas (LPG) which contains mostly $C_3$ to $C_4$ hydrocarbons. Other examples include gasoline hydrocarbon streams, naphtha hydrocarbon streams, diesel hydrocarbon streams and streams containing mainly single components such as ethylene or pentanes ($C_5$). Usually these hydrocarbon streams will contain from 5 to about 5,000 ppm $H_2S$ and from 5 to 5,000 ppm mercaptans.

The hydrocarbon stream which is to be treated is now contacted with a weakly basic aqueous stream at extraction conditions in order to extract $H_2S$ and mercaptans into the aqueous stream. By a weakly basic stream is meant a stream which contains a compound which is weakly dissociated in water (as defined in standard chemistry texts). These compounds include but are not limited to sodium carbonate, sodium bicarbonate, sodium phosphate, ammonium hydroxide, potassium carbonate, potassium bicarbonate, ammonium carbonate, ammonium bicarbonate, ammonium phosphate, etc. Strongly basic, i.e., completely dissociated compounds, such as sodium hydroxide, are not included in the basic compounds which are used to practice the present invention.

Contacting of the hydrocarbon stream with the weakly basic aqueous stream (hereinafter referred to as a basic stream) can be done by means well known in the art, using vessels which are commonly known as extractors or extraction columns. The extractor will contain a number of trays or packed beds in order to increase the contact between the two streams. These trays or beds are generally referred to as equilibrium stages and an extractor will contain from about 1 to about 20 equilibrium stages. The two streams can be contacted either concurrently or countercurrently. Typically the extraction conditions which are used in such extractors include a temperature of about 20° C. to about 50° C., a basic compound to hydrocarbon weight ratio of about 30:1 to about 0.01:1, and a pressure of about 100 to about 2500 kPa. It should be pointed out that the strength of the basic stream can be much stronger in the extraction part of the process and then can be diluted with water to a pH of about 7.1 to about 10.5, which is compatible with the microorganisms in the subsequent part of the process.

The purified hydrocarbon stream is now separated from the basic stream and collected. The hydrocarbon stream can optionally be flowed through an adsorbent bed, e.g., carbon bed, or other type of drying bed in order to remove any residual water and some sulfur compounds from the hydrocarbon stream. It is also necessary that the purified hydrocarbon stream pass the copper strip corrosion test as defined by ASTM methods D-130, D-1838 and D-2420. The copper strip test is a test which detects the presence of components in the hydrocarbon stream which may be corrosive to copper. Passing the copper strip test, i.e., minimal corrosion, provides assurance that problems will not be experienced with many of the fittings and connections that are commonly used in storage, transportation, etc., which are composed of copper or copper alloys.

The basic stream which now contains the hydrogen sulfide and mercaptans which have been converted to $HS^-$ and mercaptide ions respectively is flowed to a reactor which contains microorganisms such as cultures of the genera Thiobacillus and Thiomicrospira. These microorganisms are described in U.S. Pat. No. 5,354,545, which is incorporated by reference. These bacteria are capable of oxidizing sulfide to elemental sulfur in the presence of oxygen.

In the reactor, the microorganisms, i.e., bacteria, convert the sulfide ($HS^-$) to elemental sulfur. Simultaneously the mercaptides ($RS^-$) are converted to disulfides. Without wishing to be bound by any particular mechanism or theory, it appears that the mercaptides are converted to disulfides chemically, i.e., without the aid of the bacteria. However, the partial oxidation of the mercaptides to disulfides by the bacteria may be taking place to some extent. That is, although both biological and chemical conversion of the mercaptides to disulfides can both be occurring, it is believed that the primary conversion route is chemical.

In order to carry out the conversion of hydrogen sulfide to sulfur and the mercaptans to disulfides, the basic stream must be contacted with the microorganisms and oxygen for a sufficient time. The amount of oxygen fed to the reactor is controlled in order to convert the sulfide ions to elemental sulfur and the mercaptides to disulfides. Generally this amount of oxygen, which can be derived from air or some other oxygen source, varies from about 0.4 to about 2.0 moles $O_2$/moles S (total sulfur). Generally this time can vary from about 15 min. to about 10 hours and preferably from about 2 hrs. to about 5 hrs. Although the basic stream can be treated in a batch or continuous process, a continuous process is preferred. Other sulfide and mercaptide conversion conditions include a temperature of about 20° C. to about 50° C., a pH of about 7.1 to about 10.5 and atmospheric pressure (or higher, e.g., 100 to 1,000 kPa).

It should also be pointed out that some amount of hydrocarbons may be present in the basic stream. This is the result of either incomplete separation or the partial solubility of hydrocarbons in the basic stream. The amount of hydrocarbons will be small and usually in the range of about 1 ppm to about 500 ppm by weight. It is surprising that the bacteria can function in the presence of hydrocarbons.

Once conversion of $H_2S$ to sulfur and mercaptans to disulfides is accomplished, the basic stream is further processed in order to remove the sulfur and disulfide components in the basic stream. Since the disulfides are not very water soluble, if a sufficient quantity of disulfides is present, a disulfide layer will form at the top of the basic stream or solution. This disulfide layer can be withdrawn by any means known in the art.

Next, the basic stream is flowed from the reactor to a first separation zone where the elemental sulfur is separated from the aqueous stream usually by filtration or any other method of separating a solid from a liquid, which methods are well known in the art.

In some instances, the disulfides are not separated from the basic stream in the reactor. For example, if the concentration of the disulfides is such that only droplets are formed, then they are dispersed throughout the aqueous stream and cannot be siphoned or withdrawn from the aqueous phase. In such cases the effluent from the first separation zone is flowed to a second separation zone where the disulfide oil is separated from the aqueous stream. This can be done by settling or extraction with a solvent, both of which are well known in the art. Even if a disulfide layer is withdrawn in the reactor, further purification in a second separation zone may be desirable in order to ensure more complete removal of the disulfides and thus prevent recontamination of the hydrocarbon stream if a portion of the aqueous stream is recycled to the extractor. The purified basic stream can now either be disposed of or at least a portion of it can be recycled to the extractor and contacted with a fresh liquid hydrocarbon stream in order to further extract hydrogen sulfide and mercaptans.

Since a portion of the purified basic stream can be recycled to the extraction step and contacted with a fresh hydrocarbon stream, it is necessary that the purified stream contain less than 0.08 g/l of elemental sulfur. Controlling the sulfur level to this amount will assure that the purified hydrocarbon stream will meet the copper strip corrosion test.

The FIGURE illustrates one embodiment of the invention. Those skilled in the art will recognize that this process flow diagram has been simplified by the elimination of many pieces of process equipment including process control systems, pumps, etc. which are not necessary to an understanding of the process. It may also be readily discerned that the process flow presented in the drawings may be modified in many aspects without departing from the basic overall concept of the invention. Referring now to the FIGURE: a hydrocarbon stream containing $H_2S$ and mercaptan impurities is flowed via line 1 into extraction column 2 where it is contacted with a basic stream which is flowed into column 2 via line 3. In extraction column 2, $H_2S$ and mercaptans are extracted from the hydrocarbon stream into the basic stream. The purified hydrocarbon stream is removed via line 4 and collected. Optionally, the hydrocarbon stream can be removed via line 5, flowed to adsorbent bed 6 in order to remove any water impurities and some of the residual sulfur compounds and then withdrawn and collected via line 7.

The aqueous stream is removed from extraction column 2 via line 8 and flowed to reactor 9 where it is contacted with a sulfide oxidizing microorganism in the presence of oxygen, thereby converting the $H_2S$ to sulfur and the mercaptans to disulfides. If the disulfide oil forms a layer on top of the aqueous phase, it is withdrawn via line 10.

The aqueous stream is flowed from reactor 9 via line 11 to a first separation zone 12 where the elemental sulfur is separated from the aqueous stream. The sulfur is removed via line 13 and the aqueous stream is removed via line 14. A portion or all of the aqueous stream can be recycled via line 15 to extraction column 2.

When the aqueous phase still contains disulfides, the aqueous stream is removed via line 16 to a second separation zone 17 where the disulfides are separated from the aqueous stream by settling, extraction or other known means. The disulfides are now removed via line 18 and the aqueous stream is removed via line 19. Again, a portion of the aqueous stream can be recycled to extraction column 2 via line 20.

The following examples are presented in illustration of this invention and are not intended as undue limitations on the generally broad scope of the invention as set out in the appended claims.

EXAMPLE 1

A LPG feed stream containing 900 ppm $H_2S$ and 200 ppm mercaptans was contacted with a sodium bicarbonate solution in a single stage extractor column operated at ambient temperature (24° C.), an LPG feed rate of 375 g/hr, a bicarbonate solution feed rate of 1080 g/hr, a pressure of 1034 kPa (150 psi) and a bicarbonate solution to hydrocarbon weight ratio of 2.8. The aqueous stream was separated from the hydrocarbon stream. Analysis of the hydrocarbon stream showed that 100% of the $H_2S$ and 60% of the mercaptans were extracted from the hydrocarbon stream.

Next, the aqueous stream was flowed to a bioreactor containing Thiobacillus bacteria. This reactor was operated at ambient temperature (24° C.), a pH of 9.0 and an $O_2$/S mole ratio range of 0.5:1 to 1.0:1.0. The effluent from this bioreactor was analyzed and showed that all the $H_2S$ was converted with a selectivity of 75% to sulfur, a selectivity of 20% to sulfate and a selectivity of 5% to thiosulfate. Greater than 85% of the mercaptans were converted with a selectivity of 75% to disulfides.

What is claimed is:

1. A process for treating a hydrocarbon stream containing $H_2S$ and mercaptans consisting essentially of:
    a) contacting the hydrocarbon stream with a weakly basic aqueous stream in an extraction column at extraction conditions, thereby extracting $H_2S$ and mercaptans into the basic stream;
    b) separating the basic stream from the hydrocarbon stream and collecting a treated hydrocarbon stream which passes the copper strip test;
    c) flowing the basic stream to a reactor and contacting the stream for a sufficient time with a sulfide oxidizing microorganism, at conversion conditions in the presence of sufficient oxygen, to convert the $H_2S$ to elemental sulfur and convert the mercaptans to disulfides;
    d) separating the disulfides from the basic stream and flowing the basic stream to a first separation zone where the elemental sulfur is separated from the basic stream to give a purified basic stream, which contains less than 0.08 g/l of sulfur.

2. The process of claim 1 further characterized in that the basic stream from step (d) is flowed to a second separation zone where any remaining disulfides are separated from the purified basic stream.

3. The process of claim 2 further characterized in that at least a portion of the purified basic stream is recycled to the extraction column.

4. The process of claim 1 further characterized in that at least a portion of the purified basic stream is recycled to the extraction column.

5. The process of claim 1 where the hydrocarbon stream is a LPG stream containing $C_3$ and $C_4$ hydrocarbons.

6. The process of claim 1 where the basic stream of step (a) has a pH of about 7.5 to about 14.

7. The process of claim 1 where the pH of the basic stream of step (b) is adjusted to a value of about 7.1 to about 10.5 prior to flowing it to the reactor of step (c).

8. The process of claim 1 where the aqueous basic stream contains a basic compound selected from the group consisting of sodium carbonate, sodium bicarbonate and ammonium hydroxide.

9. The process of claim 1 where the extraction conditions include a temperature of about 20° C. to about 50° C., a basic compound to hydrocarbon weight ratio of about 30:1 to about 0.01:1 and a pressure of about 100 to about 2500 kPa.

10. The process of claim 1 where the contact time in step (c) varies from about 15 minutes to about 10 hours.

11. The process of claim 1 where the conversion conditions in step (c) include a temperature of about 20° C. to about 50° C., an $O_2$/total S mole ratio of about 0.4 to about 2.0 and a pH of about 7.1 to about 10.5.

12. A process for treating a liquid hydrocarbon stream containing $H_2S$ and mercaptans consisting essentially of:
    a) contacting the hydrocarbon stream with a weakly basic aqueous stream in an extraction column at extraction conditions, thereby extracting $H_2S$ and mercaptans into the basic stream;
    b) separating the basic stream from the hydrocarbon stream and collecting a treated hydrocarbon stream which passes the copper strip step;
    c) flowing the basic stream to a reactor and contacting the stream for a sufficient time with a sulfide oxidizing microorganism, at conversion conditions in the presence of sufficient oxygen, to convert the $H_2S$ to elemental sulfur and convert the mercaptans to disulfides;

d) flowing the basic stream from step (c) to a first separation zone where the elemental sulfur is separated from the aqueous stream;

e) flowing the basic stream effluent from step (d) to a second separation zone where the disulfides are separated from the basic stream to give a purified aqueous stream, which contains less than 0.08 g/l of sulfur; and f) recycling at least a portion of the purified basic stream to step (a).

13. The process of claim 12 where the hydrocarbon stream is a LPG stream containing $C_3$ and $C_4$ hydrocarbons.

14. The process of claim 12 where the basic stream of step (a) has a pH of about 7.5 to about 14.

15. The process of claim 12 where the pH of the basic stream of step (b) is adjusted to a value of about 7.1 to about 10.5 prior to flowing it to the reactor of step (c).

16. The process of claim 12 where the basic stream contains a basic compound selected from the group consisting of sodium carbonate, sodium bicarbonate, and ammonium hydroxide.

17. The process of claim 12 where the extraction conditions include a temperature of about 20° C. to about 50° C., a basic compound to hydrocarbon weight ratio of about 30:1 to about 0.01:1 and a pressure of about 100 to about 2500 kPa.

18. The process of claim 12 where the contact time in step (c) varies from about 15 minutes to about 10 hours.

19. The process of claim 12 where the conversion conditions in step (c) include a temperature of about 20° C. to about 50° C., an $O_2$/total S mole ratio of about 0.4 to about 2.0 and a pH of about 7.1 to about 10.5.

20. A process for treating a hydrocarbon stream containing $H_2S$ and mercaptans consisting essentially of:

a) contacting the hydrocarbon stream with a weakly basic aqueous stream in an extraction column at extraction conditions, thereby extracting $H_2S$ and mercaptans into the basic stream;

b) separating the basic stream from the hydrocarbon stream and collecting a treated hydrocarbon stream which passes the copper strip test;

c) flowing the basic stream, which contains from about 1 ppm to about 500 ppm by weight of hydrocarbons, to a reactor and contacting the stream for a sufficient time with a sulfide oxidizing microorganism, at conversion conditions in the presence of sufficient oxygen, to convert the $H_2S$ to elemental sulfur and convert the mercaptans to disulfides;

d) separating the disulfides from the basic stream and flowing the basic stream to a first separation zone where the elemental sulfur is separated from the basic stream to give a purified basic stream, which contains less than 0.08 g/l of sulfur.

21. The process of claim 20 further characterized in that the basic stream from step (d) is flowed to a second separation zone where any remaining disulfides are separated from the purified basic stream.

22. The process of claim 21 further characterized in that at least a portion of the purified basic stream is recycled to the extraction column.

23. The process of claim 20 further characterized in that at least a portion of the purified basic stream is recycled to the extraction column.

24. The process of claim 20 where the hydrocarbon stream is a LPG stream containing $C_3$ and $C_4$ hydrocarbons.

25. The process of claim 20 where the basic stream of step (a) has a pH of about 7.5 to about 14.

26. The process of claim 20 where the pH of the basic stream of step (b) is adjusted to a value of about 7.1 to about 10.5 prior to flowing it to the reactor of step (c).

27. The process of claim 20 where the basic stream contains a basic compound selected from the group consisting of sodium carbonate, sodium bicarbonate and ammonium hydroxide.

28. The process of claim 20 where the extraction conditions include a temperature of about 20° C. to about 50° C., a basic compound to hydrocarbon weight ratio of about 30:1 to about 0.01:1 and a pressure of about 100 to about 2500 kPa.

29. The process of claim 20 where the contact time in step (c) varies from about 15 minutes to about 10 hours.

30. The process of claim 20 where the conversion conditions in step (c) include a temperature of about 20° C. to about 50° C., an $O_2$/total S mole ratio of about 0.4 to about 2.0 and a pH of about 7.1 to about 10.5.

* * * * *